UNITED STATES PATENT OFFICE.

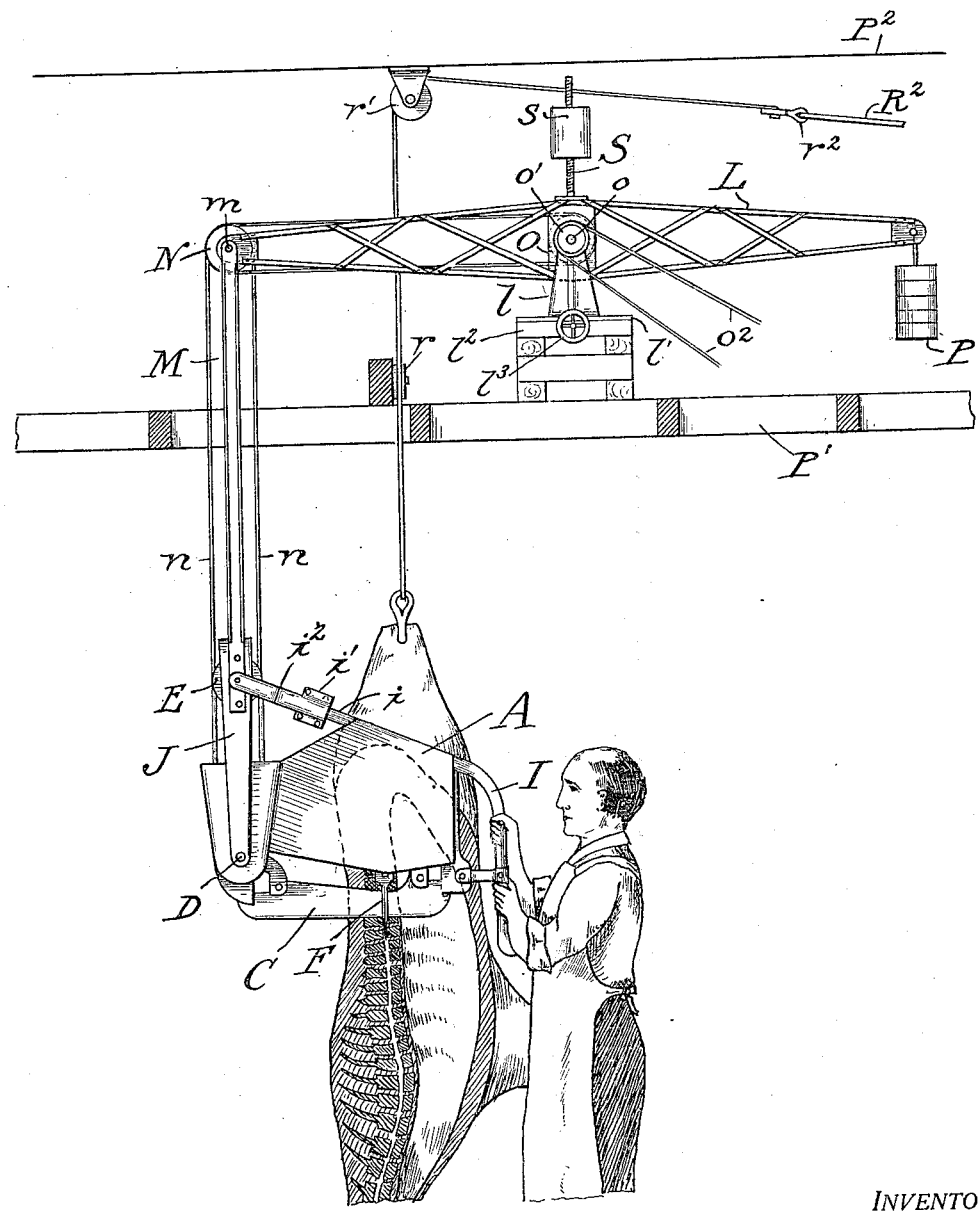

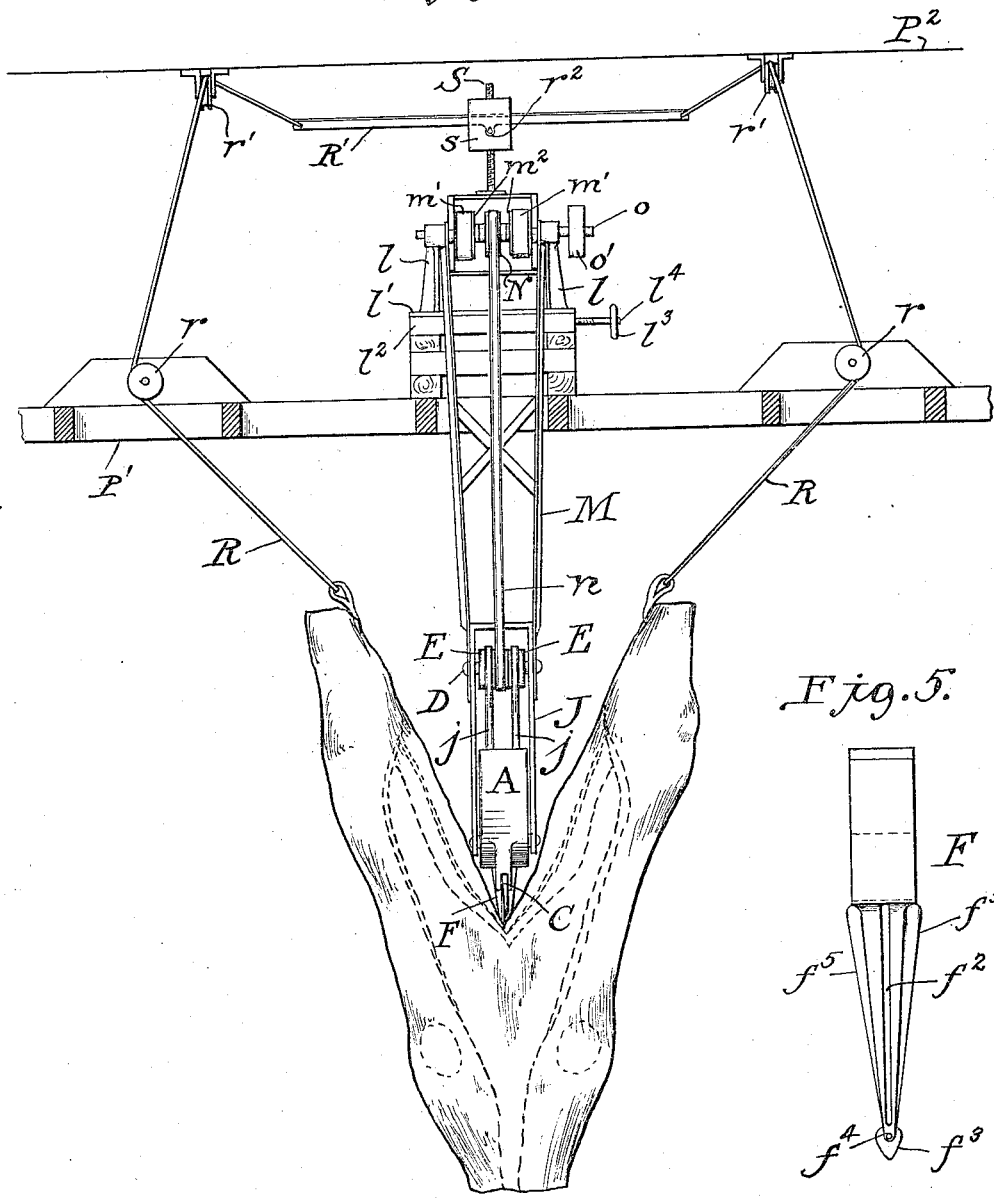

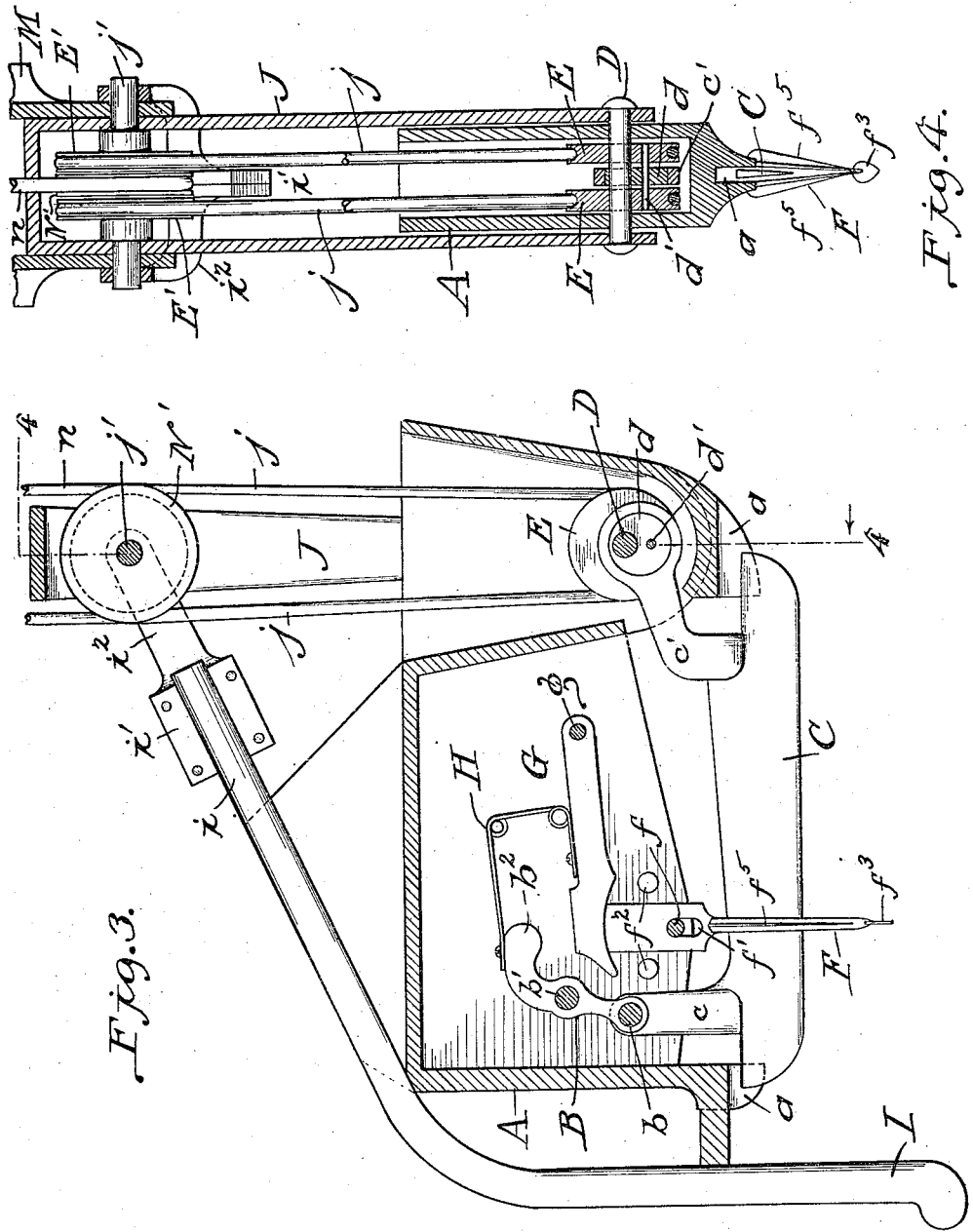

AUGUST KARHAN AND CHARLES F. KARHAN, OF NEW YORK, N. Y., ASSIGNORS OF ONE-THIRD TO MICHAEL PILNACEK, OF NEW YORK, N. Y.

CARCASS-SPLITTING MACHINE.

1,271,909.  Specification of Letters Patent.  Patented July 9, 1918.

Application filed July 17, 1915. Serial No. 40,350.

*To all whom it may concern:*

Be it known that we, AUGUST KARHAN and CHARLES F. KARHAN, citizens of the United States, residing in the city of New York, borough of Manhattan, county and State of New York, have invented a certain new and useful Carcass-Splitting Machine, of which the following is a specification.

This invention is a carcass splitting machine, and the object of the invention is to provide a machine of the character described, the cutting member of which will cut a carcass into sides in a neat and efficient manner, the cut being made with precision, directly along the center of the spinal column of the carcass.

A salient feature of the invention consists in the provision of means coöperating with the cutting member for guiding the operations thereof and centralizing said cutting member with respect to the spinal column of the carcass in such manner that the operations of the cutting member are made with precision and produce a straight, even cut directly upon the center of the spinal column. The means referred to effect the proper positioning of the cutting member in an automatic manner and also steady the operations of the machine.

A further feature of the invention resides in the fact that the cutting mechanism is supported rigidly for vertical movement, thereby obviating all side-play of the cutting mechanism and assuring a straight cut. Moreover, the supporting mechanism is so organized as to allow of vertical movement of the cutting mechanism in a predetermined path and may embody, moreover, means for accelerating the downward movement of the cutting mechanism for holding the same to its work.

In one of its practical forms, the invention embodies cutting mechanism consisting of a simultaneously reciprocating and oscillating blade mounted in a suitable supporting casing, which supporting casing is suspended, by a rigid pendulum-like frame, from one end of a balanced rocker in a manner to preclude all side-play of the apparatus, but to allow of vertical movement and swinging movement in one direction. Means are provided for suspending the carcass in proper relative position to the cutter, and with the cutting mechanism is associated a guiding wedge-member, which wedge-member is so positioned that the point thereof may enter the cavity of the spinal column of the carcass at a point forward of the cutting edge of the cutter. The guiding wedge-member is longitudinally movable, and with this wedge-member coöperates means, actuated by the cutter, for forcing the wedge-member down into the spinal cavity for the purpose of rigidly holding the same in said cavity and, at the same time, forcing the bones apart, when parted by the cutter. The rocker is mounted for sidewise movement, whereby the machine may be centralized relative to the carcass, and the cutter is given its oscillating and reciprocating movement through suitable driving mechanism mounted on the rocker and transmitted to the cutting mechanism through the pendulum-like supporting frame.

Features of the invention, other than those specified, will be apparent from the hereinafter detailed description taken in conjunction with the accompanying drawings.

In the accompanying drawings, we have illustrated one practical embodiment of the invention, but the construction shown therein is to be understood as illustrative, only, and not as defining the limits of the invention.

Figure 1 is a side elevation of the cutting mechanism and the means for supporting and actuating the same. In this figure, the machine is shown as operating upon a carcass.

Fig. 2 is an end elevation thereof.

Fig. 3 is a detail, longitudinal section of the cutting mechanism.

Fig. 4 is a transverse, vertical section taken on line 4—4 of Fig. 3, the parts of the mechanism being shown in elevation, in the interest of clearness.

Fig. 5 is a detail edge elevation of a wedge-shaped guiding member which is preferably employed.

Referring to the drawings, A indicates the housing for the cutting mechanism, which is shown in the form of a knife-blade C. Blade C is supported, at its forward end, within the housing on an upstanding, rigid post $c$, formed integral with the blade, the upper end of which post is pivotally connected with a link B by means of a pin $b$. The link B is pivoted within the housing on a pin $b'$, for reasons hereinafter to be explained. Near the opposite end of the blade is an upstanding, integral arm $c'$, the end of which is apertured to engage with an eccentric $d$, loosely mounted on a shaft D, as shown in Figs. 3 and 4. Shaft D extends transversely through the housing and on either side of the eccentric $d$, which is positioned substantially central of the housing, are pulleys E, also loosely mounted on shaft D. Pulleys E and eccentric $d$ are, however, secured together for simultaneous movement by means of a locking pin $d'$, which passes through both pulleys and through the eccentric.

When the pulleys are rotated by means hereinafter described, the eccentric will be simultaneously operated and thereby impart movement to the cutting blade. The cutting blade is guided in its movement by suitable guide slots $a$, $a$, in the housing. The fact that blade C is pivotally secured to the housing, through the link connection B, causes the movement transmitted to the blade, through the action of the eccentric, to be compound in its nature. In other words, the cutting edge of the blade will move longitudinally and, at the same time, will be given an up and down movement. These movements will very closely simulate the movements of a cleaver when operated by an experienced workman; i. e., the blade will be given a downward cutting stroke and, at the same time, a drawing action will be prevalent. This particular movement of the blade has been found to produce maximum efficiency in cutting, as the knife does not bind and all of the cutting is not done at one particular point along the edge of the blade, but, on the other hand, the blade cuts for a considerable portion of its length, and this portion is continually changing throughout a complete cycle of the cutting operation. As a result, the blade is not so apt to become nicked or dull at one particular point, but the wear is distributed along the cutting edge and is, therefore, reduced to a minimum. The blade will, therefore, maintain its edge much longer than was heretofore possible, and will cut more surely and smoothly.

One of the greatest deficiencies in carcass splitting machines heretofore suggested was the fact that no satisfactory means were provided for properly guiding the cutting blade during its operations and, accordingly, the cutting mechanism would shift from side to side and operate askew, with the result that the cut would not be clean and straight and, after the machine had once left its proper line of cut, it was extremely difficult to bring it back to proper position. Moreover, this could only be done through muscular effort on the part of the operator, who, when giving the machine the necessary twist to bring about this end, subjected the machine to great strain, which was apt to break the blade or blades employed.

According to the present invention, means is provided for directing, automatically, the cutting mechanism in the proper path, which means is shown more particularly in Figs. 3, 4 and 5, as embodied, principally, in a guiding wedge-member F. Wedge-member F is mounted interiorly of the housing on a pin and slot connection $f$, $f'$, respectively, whereby the wedge-member is adapted for longitudinal movement. Member F depends below the casing to a point below the cutting edge of the blade C, and is provided with a slot $f^2$, through which the blade extends. Member F tapers downwardly to its lower end, where it is slotted to receive a cutting tip $f^3$. The lower end of the wedge-member is preferably bifurcated to receive the tip $f^3$, and said tip is secured in place by means of a screw $f^4$.

The tip is made of such size as to fit the largest spinal-cord cavity, and it is adapted to cut its way through the walls of the smaller cavities. Moreover, the sides of wedge-member F are provided with sharp-edged ribs $f^5$, which, when member F is forced downwardly, are pressed into the walls of the spinal cavity, thereby rigidly locking said member in position. The function of wedge-member F is, therefore, to force its way into the spinal cavity of the carcass and, by virtue of its rigid engagement therewith, serve to guide the blade in a positive manner, thereby assuring a clean, straight cut.

In order to maintain wedge-shaped, driving member F at all times in rigid engagement with the spinal cavity, during the progressive cutting operation of the blade, means is associated with said member for assuring this result. This means is embodied in the link member B hereinbefore referred to, which link has pivotal connection with the post $c$ of the blade, is pivoted to the housing on the pin $b'$, extends beyond said pin, and is formed in the shape of a hammer $b^2$, adapted to engage, when properly operated, with an anvil member G, pivoted interiorly of the housing, as at $g$. In the interest of brevity, the entire member embodying the link B and hammer $b^2$ will hereinafter be termed the hammer.

Secured to the hammer at one end and at its end opposite to the anvil member G, is a spring H, the remaining portions of the spring being free to move at will. Spring H may be of any type desired, or two springs may be used, one of which operates each member. The function of spring H is twofold; first, it serves to elevate the hammer and, because of the link connection with the blade, to depress the blade, and, second, it serves to hold the anvil member in engagement with the top of the guiding wedge-member F and depress said wedge-member.

With the parts organized as specified, it will be manifest that the spring H normally serves to depress the wedge-member F into the spinal-cord cavity, and said wedge-member will enter said cavity as far as possible, depending upon the size of the cavity. The wedge-member is made so that the widest part of the wedge is substantially equal in size to the largest size of spinal-cord cavity. When operating in this maximum size cavity, the spring will operate to depress the wedge-member to its lowest degree of travel on its pin and slot connection with the housing, and the parts are so organized that, when in this depressed position, hammer B will not operate upon the wedge-member. If, however, a smaller cavity is encountered, the holding of the machine to its work will force the wedge-member upwardly against the tension of spring H and thereby bring said wedge into the zone of operation of the hammer. When this state of facts is prevalent, as the eccentric $d$ operates the blade, pivotal movement is imparted to hammer B, with the result that its free end is forced against the anvil member G and the force of the blow imparted through the anvil member to guiding wedge F. These periodical blows transmitted to the member F serve to force the wedge-shaped portion of said member downwardly through the spinal cavity in advance of the cutting edge of the knife-blade, so that said wedge-member cuts its way through the spinal-cord cavity and, in so doing, is tightly wedged at all times within said cavity, thereby assuring a rigid connection between the cutting mechanism and the work operated upon. Moreover, when the member F is wedged within the cord cavity, the blows of hammer G, during the cutting operation of the cutter C, will serve to crack the spine and thus aid in the work of the cutter. It is very infrequent that the maximum size cavity is encountered, and, accordingly, it may be said that the wedge-shaped guiding member F has a rigid connection with the spinal column of the carcass at substantially all times. However, when the maximum size cavity is encountered, the spring H will depress the wedge-member F, thereby carrying it out of the zone of operation of the hammer and obviating unnecessary wear and tear on the machine through the operations of said hammer, when such operations would be conducive to no useful result. When the cutting blade is rigidly connected with the carcass, by virtue of the wedged connection between member F and the spinal-cord cavity, said cutting blade is guided by the member F in a rigid manner, which will not allow the machine to become askew and to get out of alinement.

The cord cavity of the spinal column is slightly curved throughout its extent, and the pin and slot connection between the member F and the housing compensates for this slight variation in direction. However, to preclude the member F from getting too far out of plumb, stop pins $f^2$ are positioned on either side of said member, as shown in Fig. 3. The guide member F is thus adapted to follow the spinal cavity and guide the machine at all times with precision.

The particular mounting of the cutting mechanism upon the rocker L also facilitates the keeping of guiding member F in alinement with the spinal-cord cavity of the carcass. This will be manifest from Fig. 1 of the drawings. The spinal-cord cavity curves, for the most part, downwardly and toward the operator, and, as the rocker L is pivoted on the same side of the carcass as the operator is standing, the greater the degree to which the rocker is tilted, the closer the machine will be brought to the vertical plane of pivoting of the rocker. Thus, as the cutter progressively moves downwardly from the position shown in Fig. 1, it will be gradually swung toward the vertical plane of pivoting of the rocker, with the result that guiding member F will be automatically led to proper position in alinement with the spinal-cord cavity. Therefore, for the greater portion of the length of the spinal-cord cavity, the guiding member will be automatically brought into proper position. The cutting through the relatively opposite curve of the spine at its lowest point is of such short duration that the operator may readily manipulate the cutting mechanism throughout this portion of the travel of the cutter.

The cutting mechanism is manipulated by the operator through the medium of a handle I, extending upwardly at the end of the housing A and secured thereto, and said handle is here shown as projecting upwardly and across the upper portion of the housing to form a projecting, attaching plug $i$ at the upper portion of the machine, the function of which will hereinafter be explained.

The cutting mechanism is provided with means for suspending the same, which means is shown in the form of a yoke J, the lower ends of which are secured to the shaft D exteriorly of the housing A, and which yoke extends upwardly and across the upper portion of the housing, as shown more particularly in Fig. 4. Positioned transversely of the yoke and through the upper portion thereof is a shaft $j'$, on which are mounted two pulleys E' E'. These pulleys are in alinement with pulleys E E on shaft D, and belts $j$ connect the pulleys E E with the pulleys E' E', whereby, when the latter are operated, the former are simultaneously actuated. It will be noted that the connection between the yoke J and the casing is a pivotal one, and it is made thus to allow of the positioning of the edge of the knife at the proper inclination to the work. The parts are held in their proper positions by a clamping member $i'$, which engages with the plug $i$ of the handle member I and is connected by a yoke $i^2$ to the shaft $j'$ at the upper portion of the yoke J. The angle of inclination of the blade is determined by the position of the clamp $i'$ on the plug $i$, as will be understood.

The cutting device, as thus far described, is supported from suitable over-head mechanism, shown in the drawings in the form of a rocker member L. The rocker member L is of rigid construction, is pivoted at substantially its center on suitable standards $l$, and projects in opposite directions from its point of pivoting. To one end of the rocker member is pivoted, by means of a shaft $m$, a depending, rigid pendulum member M, the lower end of which is rigidly secured to the yoke J of the cutting mechanism.

On the shaft $m$ referred to is fixed a pulley N, around which extends a belt $n$ passing downwardly over a pulley N', fixed on shaft $j'$ between the pulleys E', whereby the rotation of the pulley N operates the pulleys E' through the pulley N'. The pulley N is in turn operated from a shaft $o$, mounted in the standards $l$, said shaft being rotated through a pulley $o'$ operated by a belt $o^2$ driven from any suitable source of power. Pulleys O are fixed on the shaft $o$ and drive the shaft $m$ through belts $m'$ which pass around pulleys $m^2$ fixed on said shaft. Thus, the belt $o^2$ serves to operate the knife-blade.

In order to counter-balance the weight of the cutting mechanism supported on one end of the rocker L, a weight P, or other counter-balance, is secured to the opposite end of the rocker, as shown in Fig. 1, whereby the parts are substantially balanced.

The rocker L is, of course, mounted on any suitable superstructure, such as a mezzanine floor or suitable over-head framing P', and the length of the pendulum member M, which supports the cutting mechanism, is such as will allow of convenient operation of the mechanism from the floor level.

The carcass to be operated upon is suspended above the floor in proper relation to the machine by means of two cables or chains R, which pass upwardly around direction sheaves $r$ on the superstructure P', and thence upwardly over other direction sheaves or pulleys $r'$, secured to the ceiling $p^2$, and, after passing through sheaves $r'$, are secured at their ends to the opposite ends of a gambrel R'. A single hoisting rope $R^2$ is secured to an eye $r^2$ at the center of the gambrel, as shown in Fig. 2.

With this organization of the hoisting mechanism, the carcass, when suspended on the ropes R, will hang plumb, and the direction sheaves $r$ are of such distance apart as to cause the sides of the carcass to be pulled apart, thereby facilitating the cutting operation of the blade, precluding the choking of the knife with consequent burning of the bone, and assisting the entrance of the guiding wedge-member F into the spinal-cord cavity. Moreover, the fact that the two lifting cables R are connected to a gambrel which is operated upon by but a single cable, allows the carcass to hang freely and in correct, plumb position, as any variation in the length of the cables or the position of their attaching hooks in the carcass, will be compensated for by the gambrel.

When a carcass is suspended as described, and the cutting mechanism suspended rigidly against sidewise movement by the conjoint operation of the rocker L and the pendulum member M, no lateral movement whatsoever will be allowed of in any of the working parts, either of the mechanism or of the carcass, and the cut of the blade must necessarily be straight.

Since no relative lateral movement may be had between the cutting mechanism and the carcass in the normal operation of cutting the latter, it is desirable to provide means whereby the cutting mechanism may be initially centralized, and this may be readily accomplished by mounting the standards $l$, which support the rocker, upon a bed-plate $l'$, which is slidable transversely of a table $l^2$. A hand-wheel $l^3$ is positioned laterally of the bed-plate and has a stem $l^4$ fixed against the longitudinal movement of the bed-plate and coöperating with a nut or other suitable means fixed on the bed-plate. Thus, by manipulating the hand-wheel $l^3$, lateral adjustment of the rocker and cutting mechanism may be had, and the machine properly centralized relative to the carcass to be operated on.

Assuming the machine to be operating as shown in Figs. 1 and 2 of the drawing, the cutting mechanism is freely suspended from the rocker L, the guiding wedge-member F is in the spinal-cord cavity of the carcass, and the cutter blade is being given the reciprocating and up and down movement through the medium of the eccentric $d$, pulleys E E', belts $j$, pulleys N' N, pulleys $m^2$, and belts $m'$, from the source of power as described, and the operator is grasping the handle I to steady the operations of the machine. With this state of facts prevalent, all lateral movement of the cutting mechanism will be precluded by the rigid construction of the pendulum member M and the rocker L, and practically the only duty of the operator is to exert a downward pull upon the handle to force the blade to its work. The operator may be assisted in this function, if desired, by positioning, above the point of the pivot of the rocker, an upstanding, rigid stem S, on which is mounted an adjustable weight $s$.

The carcass is suspended in inverted position, and the hardest part of the spine to cut is that near the neck and shoulders. Accordingly, when the cutting mechanism is operating in the first part of its downward movement through the small of the back of the carcass, the operator may easily hold the blade to its work, but, as the downward work progresses, the rocker L is tilted to such extent as to thrown the weight $s$ to one side of the plane of pivoting, whereby the pressure of the weight $s$, in its tendency to revolve the rocker L around its pivot, forces down the pendulum member and imposes said weight upon the cutting mechanism, thereby assisting the operator in cutting through the heavy shoulder and neck bones of the carcass.

One of the most pronounced deficiencies in prior carcass splitting machines was the fact that the vibration was so great as to make it very hard for the operator to properly hold and guide the cutting mechanism. Moreover, in machines embodying a circular cutter, the draw of the blade, in passing through the bones, was so pronounced as to practically pull the machine out of the hands of the operator. In the mechanism of the present invention, these difficulties are entirely obviated. The vibration in the present machine is obviated in many ways, among which may be mentioned the rigid connection between the weighted rocker and the cutting mechanism, which precludes all lateral vibration, the weight of these parts being such as to preclude up and down vibration. Moreover, vibration in the other direction is precluded by the weight and operations of the hammer, which operations are opposite to that of the cutting blade, so that the vibrations which would be caused by either one of these elements are balanced with respect to the other. Furthermore, the spring which operates between the hammer and the cutter blade cushions the operations of the parts, thereby reducing the jar to a minimum. The mechanism, in its practical operation, works very smoothly, and there is no appreciable vibration, drawing of the knife, or jar.

The organization of mechanism hereinbefore described and shown in the drawings operates with great efficiency in the splitting of a carcass into sides. The machine described embodies many features of construction which, operating in combination are conducive to this high degree of efficiency. We are aware, however, that, in the manufacture of a commercial machine, it is not absolutely essential to employ all of the various elements in combination, as a very efficient machine might be constructed by combining some of the parts, without necessarily employing all. $E.\ g.$, the weight $s$ hereinbefore referred to, while facilitating the operation of the machine, is not essential to its operation, and might be discarded if desired. In like manner, other elements might be dispensed with. For this and other obvious reasons, we do not desire to be understood as restricting ourselves to the specific structure shown and described, but consider the invention as broadly novel as commensurate with the appended claims. Moreover, while we have shown the mechanism as operated through a plurality of belts and pulleys, it will be manifest that, if a more positive drive is desired, these belts and pulleys may be replaced by chains and sprockets, and that the present invention is not limited to the form of balance shown, as this may be varied according to the requirements of the installation or the various environments in which any particular machine may be installed.

Having thus fully described the invention, what we claim as new, and desire to secure by Letters Patent, is:—

1. A carcass splitting machine embodying means for cutting, and means for simultaneously cracking the spine and guiding the machine during the cutting and cracking operations.

2. In a carcass splitting machine, cutting mechanism embodying a cutter blade, means for imparting eccentric movement thereto, and means associated with the cutting mechanism and engaging the carcass operated upon for automatically guiding the cutter blade.

3. In a carcass splitting machine, the combination of a cutter blade, means for imparting eccentric movement thereto, and a guiding member coöperating with the cutter blade and adapted to enter the spinal-cord cavity of a carcass for the purpose of guiding the operations of the cutter blade.

4. In a carcass splitting machine, the combination of a cutter blade, means for imparting eccentric movement thereto, a guiding member coöperating with the cutter blade and adapted to enter the spinal-cord cavity of a carcass for the purpose of guiding the operations of the cutter blade, and means for maintaining the guiding member in said cavity.

5. In a carcass splitting machine, the combination of a cutter blade, means for imparting eccentric movement thereto, a guiding member coöperating with the cutter blade and adapted to enter the spinal-cord cavity of a carcass for the purpose of guiding the operations of the cutter blade, and means operated by the cutter blade for maintaining the guiding member within said cavity.

6. In a carcass splitting machine, the combination of a cutter blade, means for imparting eccentric movement thereto, a guiding member coöperating with the cutter blade and adapted to enter the spinal-cord cavity of a carcass for the purpose of guiding the operations of the cutter blade, and means operated by the cutter blade for imparting intermittent movement to the guide member for the purpose of maintaining the same in said cavity.

7. In a carcass splitting machine, the combination of a cutter blade, means for imparting eccentric movement thereto, a guiding member, and means operated by the cutter blade for striking blows upon the guiding member whereby the same is forced into rigid engagement with the interior walls of the spinal-cord cavity of a carcass for the purpose of guiding the cutter blade during its cutting operation.

8. In a carcass splitting machine, the combination of a cutter blade, means for imparting eccentric movement thereto, a wedge-shaped guiding member coöperating with the cutter blade and adapted to enter the spinal-cord cavity of a carcass, and means for imparting intermittent movement to said guiding member for forcing the same into rigid engagement with said spinal-cord cavity for the purpose of guiding the operations of the cutter blade and forcing the bones apart when cut by said cutter blade.

9. In a carcass splitting machine, the combination of a cutter blade, means for imparting movement thereto, a guiding member coöperating with said cutter blade and adapted to enter the spinal-cord cavity of a carcass for the purpose of guiding the cutting operations of the cutter blade, and means operated by the cutter blade for forcing said guiding member into said cavity as the cutting operation advances.

10. In a carcass splitting machine, the combination of a cutter blade, means for imparting a simultaneous longitudinal and up and down movement to the cutter blade, and means associated with the cutter blade and engaging with the carcass operated upon for guiding the cutting operations of the cutter blade.

11. In a carcass splitting machine, the combination of a cutting blade, a guiding member mounted for longitudinal movement relative to the cutting blade and adapted to enter the spinal-cord cavity of the carcass for the purpose of guiding the cutting operations of the cutter blade, means for moving the cutting blade transversely of the guiding member, and means for forcing said guiding member into said cavity as the cutting operation advances.

12. In a carcass splitting machine, the combination of a cutter blade, means for imparting a simultaneous longitudinal and up and down movement to the cutter blade, means for guiding the cutting operations of the cutter blade, and means for imparting intermittent movement to the guiding means as the cutting operation advances.

13. In a carcass splitting machine, the combination of a cutting blade, means for imparting simultaneous longitudinal and up and down movement to the cutting blade, means for guiding the cutting operation of the cutting blade, and means, operated by the cutting blade, for imparting intermittent movement to the guiding means as the cutting operation advances.

14. In a carcass splitting machine, the combination of a cutter blade, means for imparting simultaneous longitudinal and up and down movement to the cutter blade, means for guiding the cutting operation of the cutter blade, means for imparting intermittent movement to the guiding means as the cutting operation advances, and connections, between the cutter blade and the intermittent movement imparting means for actuating said means from the cutter blade.

15. A carcass splitting machine embodying, a rigid rocker mounted intermediate its ends for pivotal movement, cutting mechanism embodying a cutter, supported from one end of said rocker, said mechanism being pivotally movable in the plane of the cutter to preclude it from lateral movement, and means for operating the cutting mechanism, in combination with a guiding member mounted for longitudinal movement relative to the cutter and adapted to extend into the spinal-cord cavity of a carcass for assuring proper cutting relations between the carcass and the cutting mechanism, and means for intermittently advancing the guiding member into the spinal-cord cavity of the carcass.

16. A carcass splitting machine embodying a rigid rocker mounted intermediate its ends for pivotal movement, cutting mechanism embodying a cutter supported from one end of said rocker, said cutting mechanism being pivotally movable in the plane of the cutter but precluded from lateral movement, and means for operating the cutting mechanism, in combination with means for imparting bodily, lateral movement to the rocker whereby the cutting mechanism may be centralized relative to the work to be operated upon.

17. A carcass splitting machine embodying a rigid rocker mounted intermediate its ends for pivotal movement, cutting mechanism embodying a cutter supported from one end of said rocker, said cutting mechanism being pivotally movable in the plane of the cutter but precluded from lateral movement, and means for operating the cutting mechanism, in combination with means for supporting the carcass against lateral movement, and means for imparting bodily, lateral movement to the rocker whereby the cutting mechanism may be centralized relative to the work to be operated upon.

18. A carcass splitting machine embodying means for cutting the spine of a carcass, in combination with means for cracking the spine of the carcass.

19. In a carcass splitting machine, cutting mechanism embodying a cutter blade, means for actuating the same, a wedge-shaped guiding member coöperating with said cutter blade, said wedge-shaped guiding member being adapted for longitudinal movement, and means, operable by the cutting mechanism, for imparting longitudinal movement to the guiding member.

20. In a carcass splitting machine, cutting mechanism embodying a cutter blade, means for actuating the same, a wedge-shaped guiding member coöperating with said cutter blade, said wedge-shaped guiding member being adapted for longitudinal movement relative to the cutting mechanism, and means for imparting bodily, longitudinal movement to the guiding member.

21. A guiding member for carcass splitting machines, embodying a downwardly tapering, rigid member provided with a longitudinal slot through which the cutter blade of the machine may extend, and provided on the tapered sides with sharpened edges whereby rigid engagement may be had between the guiding member and the spinal-cord cavity of the carcass operated on.

22. A guiding member for carcass splitting machines, embodying a rigid member, the lateral sides of which converge to one end of the member, said lateral sides being provided with knife-like edges, and said member being provided with a longitudinal slot along its medial line to allow of the passage therethrough of the cutter blade of a cutting machine.

23. A guiding member for carcass splitting machines, embodying a rigid member, the lateral sides of which converge to one end of the member, said lateral sides being provided with knife-like edges, and said member being provided with a longitudinal slot along its medial line to allow of the passage therethrough of the cutter blade of a cutting machine, and a sharp-edged tip positioned at the end of the tapered portion of the member.

24. A guiding member for carcass splitting machines, embodying a rigid member, the lateral sides of which converge to one end of the member, said lateral sides being provided with knife-like edges, and said member being provided with a longitudinal slot along its medial line to allow of the passage therethrough of the cutter blade of a cutting machine, and a sharp-edged tip detachably positioned at the end of the tapered portion of the member.

25. A carcass splitting machine embodying a cutting mechanism, in combination with a guiding member embodying a wedge-shaped portion adapted to enter the spinal-cord cavity of a carcass, said guiding member having a sliding connection with the machine, and being longitudinally movable relative to the cutting mechanism.

26. In a carcass splitting machine, a casing, a cutter blade supported on said casing, and means for actuating said cutter blade, in combination with a supporting member pivoted to the casing, and means for adjusting the angular relation of the cutter blade to the supporting member.

27. In a carcass splitting machine, the combination of a rigid rocker mounted intermediate its ends for pivotal movement, cutting mechanism rigidly supported against lateral movement from one end of said rocker, and a weighted member coöperating with the rocker and shiftable relative to the vertical plane of pivoting of said rocker when the rocker is tilted out of its horizontal position, whereby the weight of said weighted member is imposed upon the rocker to accelerate the tilting movement thereof, thereby imposing the over-balanced weight upon the cutting mechanism to aid in the cutting operation.

28. In a carcass splitting machine, the combination of a rigid rocker mounted for pivotal movement, cutting mechanism supported by said rocker, and a weighted member coöperating with said rocker and shiftable therewith, said weighted member being adapted to accelerate the rocker when the same is tilted on its point of pivoting, thereby imposing the over-balanced weight upon the cutting mechanism to aid in the cutting operation.

29. A carcass splitting machine embodying cutting mechanism, means for operating the same, means, adapted to engage the spinal-cord cavity of the carcass operated upon, for guiding the operations of the cutting mechanism, and means, operable by the cutting mechanism, for intermittently impelling said guiding mechanism into intimate engagement with the spinal-cord cavity.

30. A carcass splitting machine embodying cutting mechanism, means for operating the same, means, adapted to engage the spinal-cord cavity of the carcass operated upon, for guiding the operations of the cutting mechanism, and means, operable by the cutting mechanism, for imparting blows to the guiding means whereby said guiding means is forced into the spinal-cord cavity of said carcass.

31. A carcass splitting machine embodying cutting mechanism, means for operating the same, a wedge-shaped guiding member, adapted to engage the spinal-cord cavity of the carcass operated upon, for guiding the operations of the cutting mechanism, and means, operable by the cutting mechanism, for intermittently imparting blows to said guiding member for tightly wedging the same into the spinal-cord cavity of said carcass.

32. In a carcass splitting machine, cutting mechanism embodying a cutter blade, means for actuating the same, a wedge-shaped guiding member coöperating with said cutter blade, said wedge-shaped member being mounted for longitudinal movement relative to the cutting mechanism and adapted to extend into the spinal-cord cavity of the carcass operated upon, and percussion means coöperating with the guiding member for forcing it into said cavity.

33. In a carcass splitting machine, the combination of cutting mechanism, guiding means associated therewith adapted to enter the spinal-cord cavity of the carcass operated upon, and percussion means for forcing the guiding means into said cavity.

34. In a carcass splitting machine, the combination of cutting mechanism, means for operating the same, guiding means associated therewith adapted to enter the spinal-cord cavity of the carcass operated upon, and percussion means, operated from the cutting mechanism, for forcing the guiding means into said cavity.

35. A carcass splitting machine embodying means for cutting the spine of a carcass, and means, operable by said cutting means, for cracking the spine.

36. A carcass splitting machine embodying means for cutting the spine of a carcass, and means, operable by said cutting means, for guiding the cutting means and simultaneously cracking the spine.

37. A carcass splitting machine embodying means for cutting the spine of a carcass, means for guiding the cutting means, and percussion means, coöperating with the guiding means, for cracking the spine.

38. A carcass splitting machine embodying means for cutting the spine of a carcass, a wedge-shaped member for guiding the cuttings means, and percussion means for forcing the wedge-shaped member into the cord cavity of the spine for cracking the spine and forcing the parts thereof apart to provide clearance for the cutting means.

39. Guiding means for carcass splitting machines, embodying a downwardly tapering rigid member provided with a longitudinal slot through which the cutter blades of the machine may extend, and provided on the tapered sides with sharpened edges, whereby rigid engagements may be had between the guiding member and the spinal-cord cavity of the carcass operated on, and means for forcing said member into said cavity.

40. Guiding means for carcass splitting machines, embodying a downwardly tapering rigid member provided with a longitudinal slot through which the cutter blade of the machine may extend, and provided on the tapered sides with sharpened edges whereby rigid engagement may be had between the guiding member and the spinal-cord cavity of the carcass operated on, and percussion means for forcing said member into said cavity.

41. A carcass splitting machine embodying cutting mechanism, in combination with a wedge-shaped guiding member for said cutting mechanism, and percussion means for driving said member into the spinal-cord cavity of the carcass operated upon.

42. A carcass splitting machine embodying cutting mechanism, in combination with a wedge-shaped guiding member for said cutting mechanism, which guiding member is provided with sharpened edges, and percussion means for driving said member into the spinal-cord cavity of the carcass operated upon.

43. A carcass splitting machine embodying cutter mechanism, in combination with a guiding member embodying a wedge-shaped portion adapted to enter the spinal-cord cavity of a carcass and provided with a longitudinal slot in which the cutting element of the cutter mechanism operates, and pulsating means for driving the guiding member into the spinal-cord cavity of the carcass in advance of the cutting element.

In testimony whereof we have signed our names to this specification.

AUGUST KARHAN.
CHARLES F. KARHAN.